United States Patent [19]

Moertel

[11] Patent Number: 4,536,143
[45] Date of Patent: * Aug. 20, 1985

[54] APPARATUS FOR CONTINUOUSLY MOLDING OF ARTICLES WITH PLURAL BAND-LIKE MEMBERS

[75] Inventor: George B. Moertel, Conneautville, Pa.

[73] Assignee: Talon, Inc., Meadville, Pa.

[*] Notice: The portion of the term of this patent subsequent to Sep. 21, 1991 has been disclaimed.

[21] Appl. No.: 419,290

[22] Filed: Sep. 17, 1982

Related U.S. Application Data

[63] Continuation of Ser. No. 285,906, Jul. 23, 1981, Pat. No. 4,350,656, which is a continuation-in-part of Ser. No. 154,650, May 30, 1980, abandoned.

[51] Int. Cl.³ .............................................. B29D 5/00
[52] U.S. Cl. .................................... 425/115; 425/116; 425/122; 425/545; 425/814
[58] Field of Search ............... 425/115, 116, 121, 122, 425/129 R, 545, 556, 577, 814; 264/166

[56] References Cited

U.S. PATENT DOCUMENTS

| 2,511,402 | 6/1950 | Firing | 425/121 |
| 4,084,296 | 4/1978 | Moertel | 264/145 |
| 4,096,225 | 6/1978 | Kowalski | 264/167 |
| 4,158,532 | 6/1979 | Kowalski | 425/121 |
| 4,176,149 | 11/1979 | Moertel | 264/146 |

Primary Examiner—James Lowe

[57] ABSTRACT

One or more inner bands are employed to cooperate with an outer band and a cavity wheel or inner molding member wherein portions of the inner band or bands together with the outer band and the cavity wheel or inner molding member are utilized to continuously form the cavities for continuously molding articles. The inner band or bands are employed to form core members, intermediate cavity wall portions, and/or stripping members for the molding cavities.

3 Claims, 18 Drawing Figures

APPARATUS FOR CONTINUOUSLY MOLDING OF ARTICLES WITH PLURAL BAND-LIKE MEMBERS

CROSS-REFERENCE TO RELATED APPLICATION

This patent application is a continuation application of copending parent U.S. patent application Ser. No. 285,906 filed July 23, 1981 (now U.S. Pat. No. 4,350,656 granted Sept. 21, 1982) which is a continuation-in-part of grandparent U.S. patent application Ser. No. 154,650 filed May 30, 1980 (now abandoned), which applications are incorporated herein by reference.

TECHNICAL FIELD

The present invention relates to methods and apparatus for continuously molding articles and particularly to such methods and apparatus employing continuously moving molding members for forming cavities into which the molding material is injected.

DESCRIPTION OF THE PRIOR ART

The prior art, as exemplified in U.S. Pat. Nos. 2,511,402, 3,594,865, 3,917,787, 3,962,007, 4,096,225, 4,084,296, and 4,137,034, Great Britain Patent Specification No. 533,711 and West German Offenlegungsshift No. 2,027,963, contains a number of methods and apparatus for continuously molding articles such as slide fastener coupling elements. Some of these prior art methods and apparatus employ continuously rotatable cavity wheels and/or continuous bands for forming portions of the walls of cavities into which the molding material is injected. However, these prior art molding methods and apparatus were limited to molding rather simple shapes since the cavities and/or bands could only employ two mating mold portions to form a molding cavity; in contrast prior art molding employing reciprocating mold parts which are closed could be provided with core elements and the like to form articles with cavities or other complex shapes.

Slide fastener coupling elements with tabs on necks for engaging slots in tops of head portions of opposite mating coupling elements are shown in U.S. Pat. No. 3,886,634.

SUMMARY OF THE INVENTION

The invention is summarized in a method and apparatus for continuously molding articles, including continuously moving a plurality of band-like molding members together with an outer peripheral portion of still another molding member in respective endless paths defined by the molding members wherein at least one of the band-like members is interposed between two of the other members within a region where the molding members are held in engagement with each other to continuously form molding cavities having configurations defined by the superimposed molding members. Hardenable material is injected into and hardened in the molding cavities within the region of engagement to form articles. In moving away from the region of engagement, the molding members are separated, and the articles are removed.

An object of the invention is to improve the continuous molding of articles enabling the formation of complex shapes and/or expeditious removal of articles from a cavity wheel.

Another object of the invention is to provide for forming slots, cavities, etc. in central portions of articles molded by means of cavity wheels, bands, and the like.

One advantage of the invention is that the forming of molding cavities by cavity-defining portions on at least three superimposed continuous-moving molding members, at least two of which are band-like, enables the forming of cavities with complex shapes and/or core-like portions to mold complex or hollow articles.

Another advantage of the invention is that an inner band-like member or members can provide improved stripping of molded articles from other molding members.

Other objects, advantages and features of the invention will be apparent from the following description of the preferred embodiments taken in conjunction with the accompanying drawings.

DESCRIPTION OF THE PREFERRED EMBODIMENTS

Figure 1:
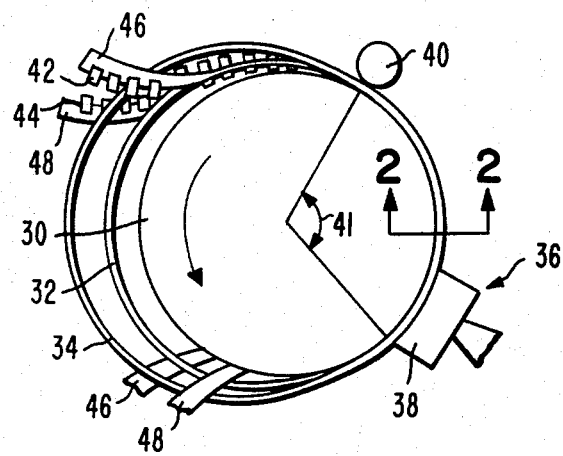
FIG. 1 is a diagrammatical view of a molding apparatus in accordance with the invention.

As illustrated in FIG. 1, one apparatus employing the invention includes an inner molding member or cavity wheel 30, an inner band-like molding member or band 32 extending around the cavity wheel 30, and an outer band-like molding member or band 34 extending around the inner band 32 and the cavity wheel 30. The inner band 32 has a circumference larger than the periphery of the wheel 30, and the outer band 34 has a circumference larger than the circumference of the inner band 32. An injection mechanism, indicated generally at 36 and including a shoe 38, along with a roller 40 engages and forces the outer band 34 and inner band 32 together and against the cavity wheel 30 within an angle of engagement 41. Motor means 43 is drivingly connected to the cavity wheel 30 for continuously rotating the wheel 30, as well as rotating or continuously moving the bands 32 and 34 in endless paths defined by the bands, in the same direction past the injection mechanism 36 and the roller 40 so that within the angle of engagement 41 the bands 32 and 34 and the cavity wheel 30 are continuously held in engagement. The inner band 32, during movement along its endless path through at least the angle of engagement 41, is interposed between the endless paths of movement defined by the outer band 34 and the periphery of the cavity wheel 30. The cavity wheel 30 and the bands 32 and 34, where engaged together in the angle of engagement 41, form molding cavities for receiving molding materials which is hardened therein to continuously form articles.

Figure 7:
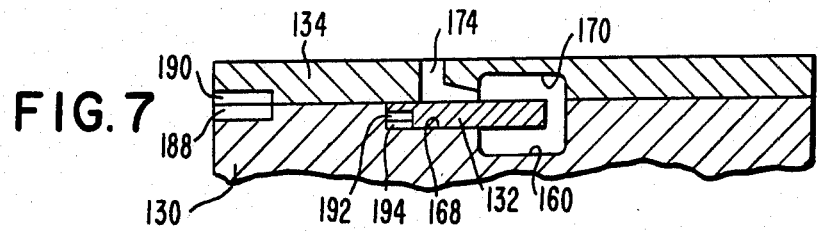
FIG. 7 is a cross-sectional view of a broken-away portion of a second variation of the molding apparatus in accordance with the invention.
Figure 8:
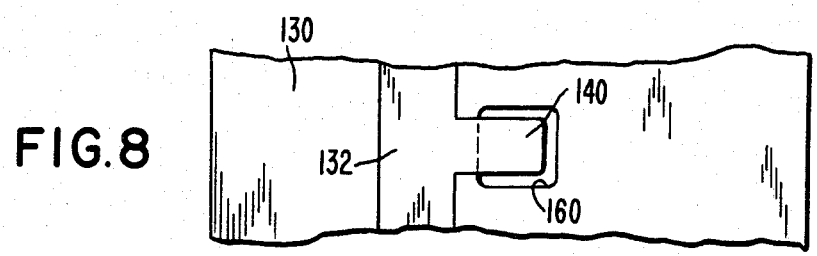
FIG. 8 is a plan view of a broken-away segment of the periphery of the cavity wheel and inner band of the apparatus of FIG. 7.
Figure 9:
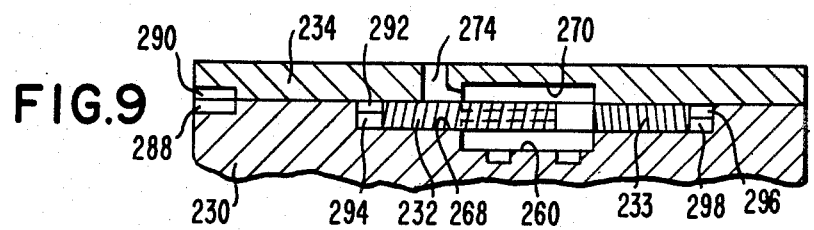
FIG. 9 is a cross-sectional view similar to FIG. 7 but of a third variation of the molding apparatus.
Figure 10:
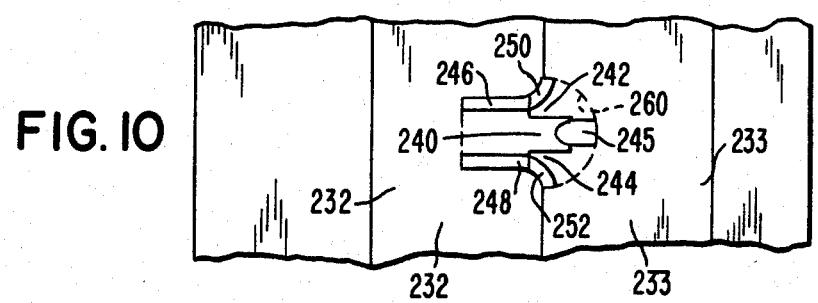
FIG. 10 is a plan view of a broken-away segment of a periphery of a cavity wheel with a pair of inner bands in the apparatus of FIG. 9.
Figure 11:
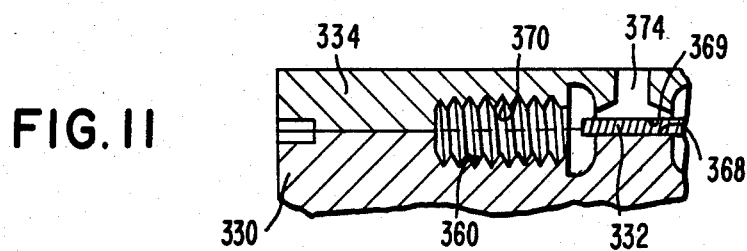
FIG. 11 is a cross-sectional view of a broken-away portion of a fourth variation of the molding apparatus.
Figure 12:
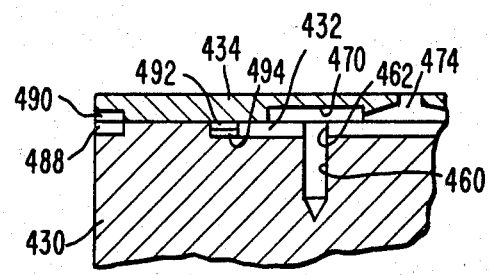
FIG. 12 is a cross-sectional view similar to FIG. 11 but of a fifth variation of the molding apparatus.
Figure 13:
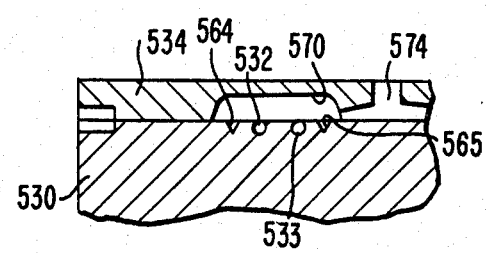
FIG. 13 is a cross-sectional view similar to FIGS. 11 and 12 but of a sixth variation of the molding apparatus.
Figure 14:
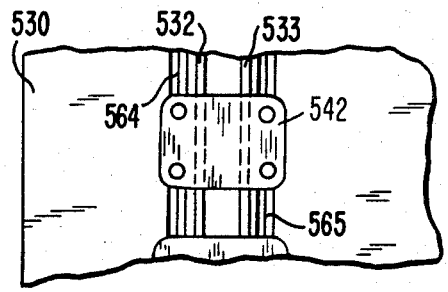
FIG. 14 is a plan view of a broken away segment of the outer periphery of the cavity wheel with a pair of stripping bands from the molding apparatus of FIG. 13 showing a molded article thereon.
Figure 15:
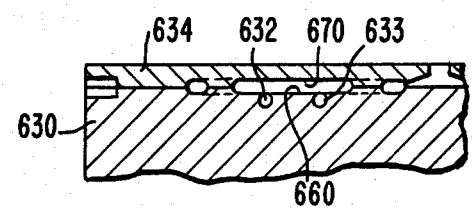
FIG. 15 is a cross-sectional view similar to FIGS. 11–13 but of a seventh variation of the molding apparatus.
Figure 16:
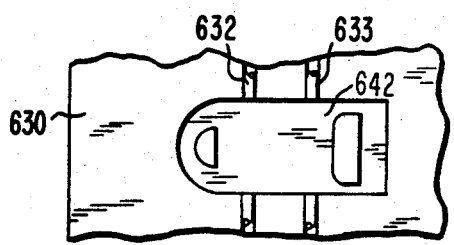
FIG. 16 is a plan view similar to FIG. 14 but of the variation of FIG. 15.

The molding apparatus shown in FIGS. 1-6 is particularly designed for molding slide fastener elements 42 and 44 on respective inner edges of carrier tapes 46 and 48, the variation of FIGS. 7 and 8 is designed to mold retainers for slide fasteners, the variation of FIGS. 9 and 10 is designed to mold sliders for slide fasteners, the variation of FIG. 11 is designed to mold bolts, the variation of FIG. 12 is designed to mold nails, the variation of FIGS. 13 and 14 is designed to mold parts 542, e.g. snap fastener elements, and the variation of FIGS. 15-16 is designed to mold pulls 642 for sliders of slide fasteners. Many other variations can be devised for molding various other articles.

In the apparatus of FIGS. 1-6 for molding coupling elements 42 and 44 on inner edges of slide fastener tapes 46 and 48, the cavity wheel 30 includes an outer annular member 50 suitably mounted on inner wheel members 52, 54 and 56. A pair of continuous spaced rows of cavity portions 60 and 62 are formed in the central outer peripheral portion of the member 50 for defining lower portions of the respective coupling elements 42 and 44. Annular channels 64 and 66 are formed in the periphery in the wheel member 50 and have inner portions intersecting the outer portions of the cavities 60 and 62; such outer portions of the cavities 60 and 62 corresponding to body and heel portions of the elements 42 and 44. The channels 64 and 66 are designed to receive the tapes 46 and 48. An annular channel 68 is formed in the center of the periphery of the wheel 30 for receiving the band 32. Outer portions of the channel 68 intersect inner portions of the respective cavities 60 and 62 which correspond to the top portions of heads of the coupling elements 42 and 44. A pair of continuous spaced rows of cavity portions 70 and 72 are formed in central portions of the inner surface of the band 34. The band 32 has opposite edge portions 71 and 73 which, during the angle of engagement 41, extend between inner portions of respective pairs of aligned cavity portions 60, 70 and 62, 72 to define core elements for the molding apparatus to form grooves in the heads of the respective coupling elements 42 and 44. The edge portions 71 and 73 also define wall portions of the molding cavities intermediate between outer cavity wall portions defined by the outer band 34 and inner cavity wall portions defined by the periphery of the cavity wheel 30. The recesses or cavities 60 and 62 contain tongue-forming cavity portions 96 for forming tongues on the coupling elements 42 and 44 for engaging the grooves in the heads of opposite mating coupling elements. Openings 74 to the outside of the band 34 are formed between each pair of adjacent cavities 70 and 72 and have gate portions 76 and 78 communicating with inner portions of the cavities 70 and 72.

For maintaining registration and alignment of the band 34 relative to the wheel 30, an outward extending annular flange 80 is formed on one side edge of the outer periphery of the member 50, and an annular ring member 82 is mounted in a groove on the opposite edge of the wheel 30. The flange 80 has an outer beveled surface 84 and an inner surface 86 extending perpendicular to the axis of rotation of the wheel 30 for engaging and positioning the one edge of the band 34 in a direction parallel to the axis of rotation. The ring member 82 has a series of rounded teeth or undulations 88 on the outer surface thereof for engaging mating teeth or undulations 90 formed by machining the inner surface of the other edge of band 34 to maintain angular positioning of the band 34 relative to the wheel 30. Inner edges of the teeth 88 engage inside edges of the band 34 bordering the teeth or undulations 90 cut in the band 34 in a direction parallel to the axis of rotation.

As is apparent in FIG. 1, the steels bands 32 and 34 are sufficiently flexible to permit their engagement with each other and against the wheel 30 throughout the angle of engagement 41. While the particular structure of each steel band may vary to accommodate particular requirements of specifications and installation, an example of such a steel band is disclosed in U.S. Pat. No. 4,268,474 which is incorporated herein by reference. Preferably at least the outer flexible band 34 has a thickness greater than 0.002 times the diameter of the wheel 30, and is maintained with a substantial inward radius of curvature equal to or greater than the radius of the wheel 30 throughout every point of the band 34 to avoid fatigue and failure in accordance with U.S. Pat. No. 4,268,474. The inner flexible band 32 may also have a thickness several times greater than 0.001 times the diameter of the wheel 30 and be maintained with a substantial inward radius of curvature equal to or greater than the radius of the wheel portion against which the band 32 engages, depending upon the selected thickness of the band 32 and the diameter of the wheel 30.

Figure 3:
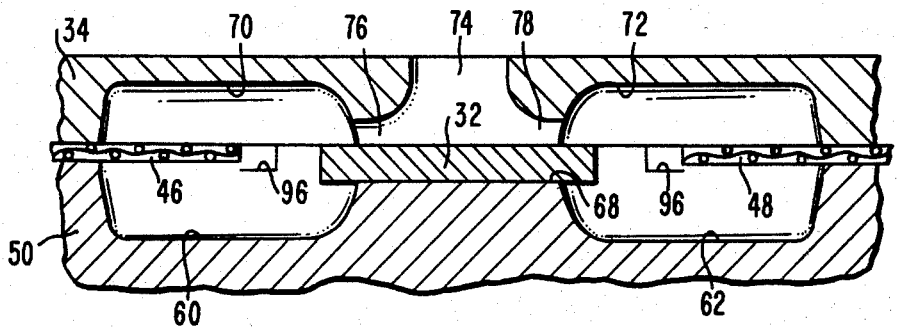
FIG. 3 is a further enlarged sectional view of a broken-away portion from the structure shown in FIG. 2.
Figure 4:
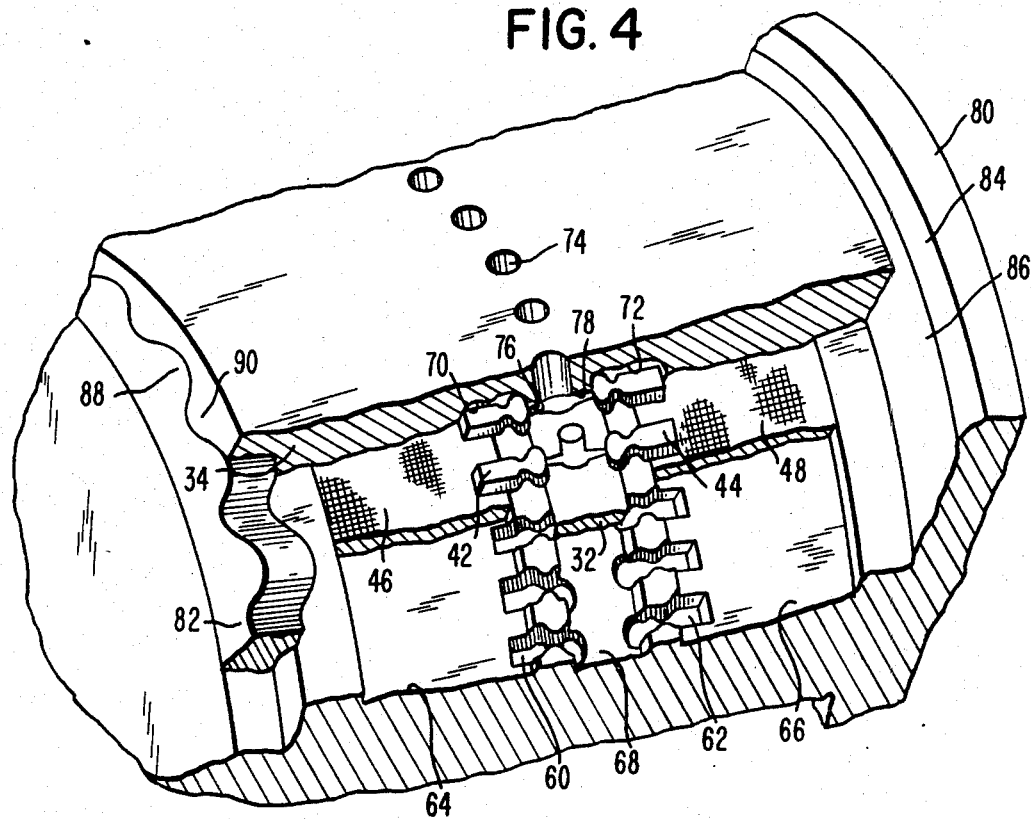
FIG. 4 is a perspective view of a broken-away portion of the molding apparatus of FIG. 1.
Figure 5:
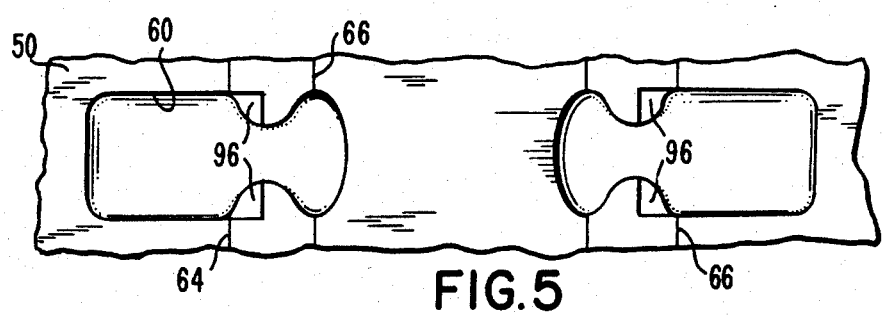
FIG. 5 is a plan view of one broken-away portion of a cavity wheel in the apparatus of FIGS. 1–4.
Figure 6:
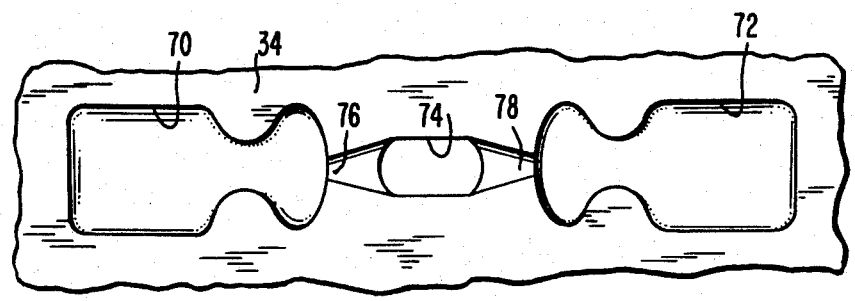
FIG. 6 is a plan view of a broken-away portion of an outer band of the apparatus of FIGS. 1–4.

As shown in FIG. 3 it is noted that, in the angle of engagement 41, the upper surface of the tapes 46 and 48 and the band 32 form a common cylindrical surface section with the outer surface of the peripheral member 50.

In operation of the apparatus of FIGS. 1-6 and practice of the method of making slide fastener coupling elements, the cavity wheel 30, inner band 32 and outer band 34 are continuously rotated. The outer peripheral portion 50, the inner band 32 and the outer band 34 continuously move in the respective endless paths defined thereby. Tapes 46 and 48 are fed into the channels 64 and 66 of the cavity wheel 30 at a point prior to the engagement angle and where the bands 32 and 34 are separated from each other and the cavity wheel 30. As the wheel 30 and bands 32 and 34 are rotated, the shoe 38 engaging the band 34 continuously forces the bands 34 and 32 into engagement with each other and against the outer peripheral portion 50 of the wheel 30 with the inner band 32 interposed between the outer band 34 and the wheel 30. The roller 40 insures that the bands 32 and 34 remain in engagement throughout the angle of engagement 41. The band 34 is maintained in registration with the cavity wheel 50 by engagement of the teeth or undulations 90 with the teeth or undulations 88 formed on the outer edge of the cavity wheel. Flange 80 as well as the ring 82 engage the band 34 to maintain its positioning in a direction parallel to the axis of rotation.

The cavities 60 and cavities 70 together with portions 71 of the left edge (as viewed in FIGS. 2–4) of the inner band 32 form cavities for molding the coupling elements 42 on the inner edge of the tape 46 while the cavities 62 and 72 together with portions 73 of the right edge of the inner band 32 form cavities for molding the coupling elements 44 on the inner edge of the tape 48. The core portions 71 and 73 carried by the band 32 are continuously inserted into the molding cavities for forming slots in the heads of the fastener elements molded in the molding cavities. The portions 71 and 73 also continuously form intermediate wall portions of the molding cavities between inner molding cavity wall portions formed by the cavity wheel periphery and outer molding cavity wall portions formed by the outer band 34.

Molten thermoplastic or other molding material is injected by the injection mechanism 36 through the openings 74 and gates 76 and 78 into the respective cavities as the cavities pass the injection mechanism 38. Subsequently the injected molding material is hardened as engaging portions of the cavity wheel 30 and bands 32 and 34 continue to rotate through the angle of engagement 41; for example, molten thermoplastic is cooled and solidified by contact with the cavity wheel 30 and bands 32 and 34.

After the coupling elements are hardened, the cavity wheel 30 and the bands 32 and 34 rotate past the roller 40, and the bands 32 and 34 separate from the molding wheel. Because the band 32 engages into the head portions of the coupling elements, the separation of the band 32 from the cavity wheel 30 and the outer band 34 also removes or strips the coupling elements 42 and 44 from the cavities 60 and 62 of the cavity wheel and the cavities 70 and 72 of the band 34. The coupling elements 42 and 44 with their support tapes 46 and 48 are then removed from the band 32; the resilience of the molded polymer permits the elements to be pulled from the band without damage, or the elements may be broken apart prior to removal. The sprues formed in the openings 74 and gates 76 and 78 are subsequently severed.

The employment of rotating cavity wheels, inner and outer bands to form cavities for molding articles permits continuous molding of complicated shapes by utilizing inner band members as core members, or by forming intermediate cavity wall portions between inner and outer cavity wall portions defined by the respective cavity wheel periphery and outer band, for making complex shapes.

Figure 2:
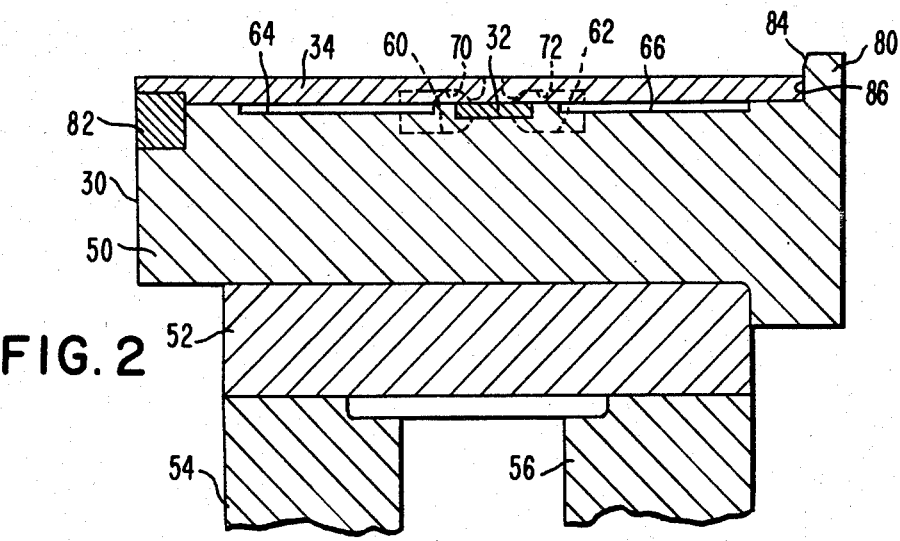
FIG. 2 is a section view taken at line 2—2 in FIG. 1 and enlarged from FIG. 1 of a portion of the molding apparatus.
Figure 17:
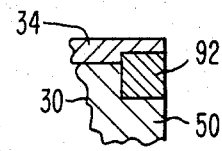
FIG. 17 is a sectional view of a broken-away portion of a modification of the apparatus of FIG. 2.

In a modification shown in FIG. 17, the flange 80 of FIG. 2, is replaced by an annular ring member 92 substantially identical to the ring member 82 and mounted in a groove in an edge of the wheel. The member 92 has a series of rounded teeth (not shown) mating with teeth (not shown) on the band 34 with inner edges of the member teeth engaging inside edges of the band in a manner substantially a mirror image of the member 82, teeth 88 and teeth 90 of FIG. 2.

Figure 18:
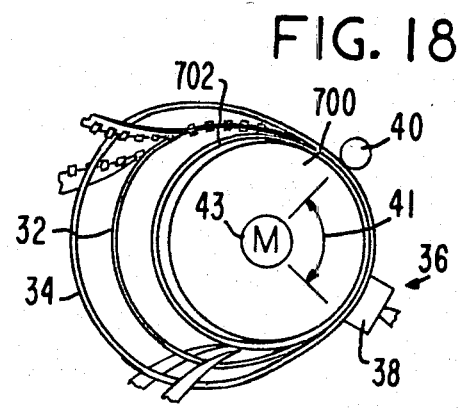
FIG. 18 is a diagrammatical view of a variation of the molding apparatus in accordance with the invention.

In a variation shown in FIG. 18, the cavity wheel of the embodiment of FIG. 1 is replaced by a wheel 700 around which a flexible steel band 702 passes. Continuous rows of cavities, channels for receiving the tapes and the band 34, and registration teeth, substantially similar to the cavities 60 and 62, channels 64, 66, and 68 and teeth 88, are formed in the outer periphery of the band 702. The bands 702, 32 and 34 are continuously driven by the motor means 43 via the wheel 700 to move in respective endless paths defined by the bands. In the angle of engagement 41 bands 702, 32 and 34 are held in engagement with each other and against the wheel 700, and articles are formed in the cavities continuously being formed by the superimposed and engaged bands by injecting molding material from the injecting mechanism 38.

In the variation of FIGS. 7 and 8, an inner molding member or cavity wheel 130, inner band 132 and outer band 134 have portions which, when engaged together, form a molding cavity to form a retainer for a slide fastener. Lower portions 160 of the cavities are formed in a continuous row in the outer periphery of the cavity wheel which contains a channel 168 for receiving the inner band 132. Upper portions 170 of the molding cavities are formed on the inside of the band 134 while openings 174 extend through the band 134 to the upper surface thereof for providing a passage for molding material. The inner band 132 has projections 140 which extend into central portions of the cavities formed by the cavity portions 160 and 170 so as to form core members extending into the cavities. The cavity wheel 130 is provided with registration teeth 188 which mate with registration teeth 190 of the outer band 134 to maintain registration of the outer band 134 with the cavity wheel 130. Similarly, the inner band 132 is provided with registration teeth 192 which engage registration teeth 194 on the cavity wheel 130 to maintain the registration of the inner band 132 relative to the outer band 134 and cavity wheel 130. In operation of the variation of FIGS. 7 and 8, retainers are continuously formed in the cavities defined by the cavity wheel 130 and bands 132 and 134 in the angle of engagement by injecting and hardening molding materials in the cavities. After separation of the bands 132 and 134 from each other and the cavity wheel 130, the retainers are removed from the projections 140.

The variation of FIGS. 9 and 10 includes an inner molding member or cavity wheel 230, a pair of inner bandlike molding members or bands 232 and 233 and an outer bandlike molding member or band 234 which have respective portions for forming molding cavities to form sliders for a slide fastener. The inner bands 232 and 233 have circumferences larger than the periphery of the wheel 230, and the outer band 234 has a circumference larger than the circumference of the inner bands 232 and 233. The cavity wheel 230 has a continuous row of cavity portions 260 designed to form the lower portions of the sliders and has an annular channel 268 for receiving the pair of inner bands 232 and 233 side-by-side interposed between the outer band 234 and cavity wheel 230. Cavity portions 270 are formed in the inner surfaces of the band 234 to form upper portions of the sliders. The cavity portions 270 communicate with input injection passages 274 which open in the upper surface of the band 234. The band 232 has core projections 240 while the band 233 has core projections 242 and 244 which cooperate with the core projection 240 to form the interior of the slider leaving an opening 245 to form the post of the slider. Grooves 246, 248, 250 and 252 in the respective bands 232 and 234 are designed to form the flanges on the sliders for engaging the heels of the coupling elements. Engaging teeth 288 and 290 on the respective cavity wheel 230 and band 234 provide for registration of the band 234 relative to the cavity wheel 230. Teeth 292 and 296 on the respective bands 232 and 233 mate with teeth 294 and 298 formed in the cavity wheel 230 to maintain registration of the bands 232 and 233 relative to the cavity wheel 230 and the outer band 234.

In operation of the variation of FIGS. 9 and 10, the inner bands 232 and 233 move through the region of engagement side-by-side with the core projections 240, 242 and 244 inserted in the molding cavities to form the interior surfaces of the sliders. The inner bands are separated after disengaging the cavity wheel 230 to permit removal of the sliders from the projections 240, 242 and 244.

In the variation of FIG. 11, a cavity wheel 330 has a row of cavity portions 360 formed in the outer periphery thereof for cooperating with a row of cavity portions 370 in the inner surface of an outer band 334 to form cavities in the shape of a bolt. An inner band 332 contained within channels 368 and 369 formed in the engaging surfaces of the cavity wheel 330 and the band 334 extends into inner edges of the cavities formed by the cavity portions 360 and 370 to form a slot in the head portions of the bolts molded in the cavities. Injection passages 374 are provided through the band 334 for injecting molding material into the cavities. As shown, the rows of cavities 360 and 370 may be duplicated to form two rows of cavities for forming bolts.

In the variation of FIG. 12, an outer band 434 has rows of cavity portions 470 for forming the heads of nails while bores 460 extend into the cavity wheel 430 for forming the lower portion of the shaft of the nails. Openings 462 formed through inner band 432 form an upper portion of the shaft of the nail adjacent to the head portions. The band 432 defines a completely circumscribing intermediate wall portion of each cavity between an inner wall portion defined by the periphery of the cavity wheel 430 and an outer wall portion defined by the outer band 434. Injection passages 474 open into the cavity portions 470 for admitting molding material. Teeth 488 and 494 of the cavity wheel 430 engage teeth 490 and 492 on the respective bands 434 and 432 to maintain registration of the bands 432 and 434 with the cavity wheel 430 during the angle of engagement. In operation of the variation of FIG. 12, the band 432 strips the nail formed within the cavities from the cavity wheel 430 as the band 432 disengages the cavity wheel 430. The nails are then removed from the inner band 432.

In the variation of FIGS. 13 and 14, stripping wires or bands 532 and 533 are provided within grooves extending in the cavity wheel 530. Cavities 570 for forming a molded part, for example a snap fastener component, are formed in the inner surface of the band 534 and communicate by an injection molding passage 574 to the outer surface of the band 534 for receiving injected molding material as the cavity wheel 530 and bands 532 and 534 rotate through an angle of engagement. The bands 532 and 533 extend along the bottom surface of the cavities formed between the cavity wheel 530 and the outer band 534, and form portions of the inner walls of the molding cavities. Grooves 564 and 565 formed in the cavity wheel 530 provide for the production of connecting strips joining series of the components or parts molded in the cavities together. In operation of the variation of FIGS. 13 and 14, connecting strips are formed in the grooves 564 and 565 joining parts being continuously molded in the cavities formed by the cavity portions 570 and bands 532 and 534 during rotation through the angle of engagement. The bands 532 and 534, after the angle of engagement, separate or strip the continuous connected string of parts molded in the cavities defined by the cavity wheel 530 and bands 532, 533 and 534 from the cavity wheel.

In the variation of FIGS. 15 and 16, a cavity wheel 630 and a band 634 have respective rows of registrable cavities 660 and 670 for forming pulls for sliders of slide fasteners. Inner bands 632 and 633 in the form of wires are provided in respective annular grooves of the cavity wheel 630 for forming portions of bottom surfaces of the pulls and for removing the pulls from the cavities of the cavity wheel 630 upon disengagement of the bands 632 and 633 from the cavity wheel 630.

Since many modifications, variations and changes in detail may be made to the embodiments described above and shown in the accompanying drawings, it is intended that all matter described in the foregoing description and shown in the drawings be interpreted as illustrative and not in a limiting sense.

What is claimed is:

1. An apparatus for producing a row of coupling members for a slide-fastener stringer comprising:
    a forming wheel provided on the periphery with a multiplicity of equispaced outwardly open forming beds having configurations complementary to contours of respective coupling members to be formed therein, and a circumferential outwardly open groove intersecting said beds;
    an endless forming band extending around a portion of the periphery of said wheel and provided with openings respectively registering with said beds whereby said each opening and the bed in registry therewith forms a respective mold cavity;
    an undercutting band received wholly in said groove and interposed between said periphery of said wheel and said forming band and projecting into said mold cavity, said forming band being of a width sufficient to span over said beds and said undercutting band on the periphery of said wheel; and
    means for introducing thermoplastic synthetic resin into each of said mold cavities to produce respective coupling members of complementary shape therein whereby, upon separation of said members from said wheel and said bands, said undercutting band forms an undercut portion in each coupling member.

2. The apparatus defined in claim 1 further comprising means for feeding at least one textile strand into said mold cavities beneath said bands in regions of said wheel whereby said strand is embedded in said coupling members.

3. The apparatus defined in claim 2 wherein said bands are composed of the same material.

* * * * *